(12) United States Patent
Hwang et al.

(10) Patent No.: US 10,843,548 B1
(45) Date of Patent: Nov. 24, 2020

(54) POWER TRANSMISSION APPARATUS OF HYBRID ELECTRIC VEHICLE

(71) Applicants: Hyundai Motor Company, Seoul (KR); Kia Motors Corporation, Seoul (KR)

(72) Inventors: Seong Wook Hwang, Gunpo-Si (KR); Soonki Eo, Ansan-Si (KR); Ilhan Yoo, Hwaseong-Si (KR); Dongwoo Kim, Incheon (KR); Yong Sug Choi, Hwaseong-Si (KR); Jong Hyo Park, Ansan-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/890,355

(22) Filed: Jun. 2, 2020

(30) Foreign Application Priority Data

Jan. 8, 2020 (KR) .......................... 10-2020-0002679

(51) Int. Cl.
| | |
|---|---|
| *B60K 6/365* | (2007.10) |
| *F16H 37/04* | (2006.01) |
| *B60K 6/38* | (2007.10) |
| *B60K 6/26* | (2007.10) |
| *B60K 6/442* | (2007.10) |

(52) U.S. Cl.
CPC ............... *B60K 6/365* (2013.01); *B60K 6/26* (2013.01); *B60K 6/38* (2013.01); *F16H 37/046* (2013.01); *B60K 6/442* (2013.01); *B60Y 2200/92* (2013.01); *B60Y 2400/421* (2013.01); *B60Y 2400/73* (2013.01)

(58) Field of Classification Search
CPC . B60K 6/365; B60K 6/38; B60K 6/26; B60K 6/442; F16H 37/046; B60Y 2200/92; B60Y 2400/73; B60Y 2400/421
See application file for complete search history.

(56) References Cited

U.S. PATENT DOCUMENTS

| | | | |
|---|---|---|---|
| 7,258,032 B2 * | 8/2007 | Kim ........................ | F16H 3/006 74/330 |
| 2019/0118642 A1 * | 4/2019 | Cho ....................... | F16H 37/046 |
| 2020/0063835 A1 * | 2/2020 | Hwang ..................... | F16H 3/54 |

* cited by examiner

*Primary Examiner* — Justin Holmes
(74) *Attorney, Agent, or Firm* — Morgan, Lewis & Bockius LLP (57) ABSTRACT

A power transmission apparatus of a hybrid electric vehicle may include a first input shaft mounted along an axis of an engine shaft and selectively connectable to the engine shaft, a second input shaft formed as a hollow shaft, coaxially mounted with the first input shaft, and fixedly connected to a rotor of the first motor-generator, a third input shaft formed as a hollow shaft, coaxially mounted with the first input shaft, and selectively connectable to the first input shaft, an intermediate shaft mounted in parallel with the first input shaft, an output shaft mounted in parallel to the first input shaft and outputting a shifted torque, a planetary gear set mounted on the output shaft, having an element fixed to the output shaft and forming a shifted torque, and a plurality of gear sets mounted on the first, second, and third input shafts, the intermediate shaft, and the output shaft.

14 Claims, 4 Drawing Sheets

| Shift-stage | ECL | DC1 | DC2 | SL1 | | SL2 | | SL3 | |
|---|---|---|---|---|---|---|---|---|---|
| | | | | SG1 | N | SG2 | N | SG3 | N | SG4 |

| | Shift-stage | ECL | DC1 | DC2 | SG1 | N | SG2 | N | SG3 | N | SG4 |
|---|---|---|---|---|---|---|---|---|---|---|---|
| Engine mode (parallel hybrid mode) | FD1 | ● | ● | | ● | | | | (●) | ● | (●) |
| | FD2 | ● | ● | | | ● | ● | | (●) | ● | (●) |
| | FD3 | ● | ● | ● | | ● | | | (●) | ● | (●) |
| | FD4 | ● | | ● | ● | | ● | | (●) | ● | (●) |
| | FD5 | ● | | ● | | ● | | ● | (●) | ● | (●) |
| EV mode | FD1 | | | | | ● | | ● | ● | | ● |
| | FD2 | | | | | ● | | ● | ● | | |

● : Operated    (●) : Operable in parallel hybrid mode

| | Shift-stage | ECL | DC1 | DC2 | SL2 | | SL2 | | SL3 | | SL3 |
|---|---|---|---|---|---|---|---|---|---|---|---|
| | | | | | SG1 | N | SG2 | N | SG3 | N | SG4 |
| Engine mode (parallel hybrid mode) | FD1 | ● | ● | | ● | | | | (●) | ● | (●) |
| | FD2 | ● | ● | | | | ● | | (●) | ● | (●) |
| | FD3 | ● | ● | ● | | ● | | | (●) | ● | (●) |
| | FD4 | ● | | ● | ● | ● | ● | | (●) | ● | (●) |
| | FD5 | ● | | ● | | ● | | | (●) | ● | (●) |
| EV mode | FD1 | | | | | ● | | ● | | | ● |
| | FD2 | | | | | ● | | ● | ● | | |
| Series mode | FD1 | ● | | | | ● | | ● | | | ● |
| | FD2 | ● | | | | ● | | ● | ● | | |

● : Operated    (●) : Operable in parallel hybrid mode

POWER TRANSMISSION APPARATUS OF HYBRID ELECTRIC VEHICLE

CROSS-REFERENCE TO RELATED APPLICATION

The present application claims priority to Korean Patent Application No. 10-2020-0002679 filed on Jan. 8, 2020, the entire contents of which is incorporated herein for all purposes by this reference.

BACKGROUND OF THE INVENTION

Field of the Invention

The present invention relates to a power transmission apparatus of a hybrid electric vehicle.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

An electric vehicle (EV) and a hybrid electric vehicle (HEV) that utilize electrical energy, and a double clutch transmission (DCT) improving efficiency and convenience may be examples of environment-friendly technologies.

The double clutch transmission (DCT) includes two clutches devices and a gear train of a basically manual transmission, selectively transmits a torque input from an engine to two input shafts by use of the two clutches devices, and outputs a torque shifted by the gear train.

Such a double clutch transmission (DCT) attempts to compactly realize a multi-stage transmission of more than five speeds. The DCT achieves an automated manual transmission (AMT) that removes the inconvenience of a manual shifting of a driver, by controlling two clutches and synchronizers by a controller.

In comparison with an automatic transmission using planetary gears, such a DCT shows merits, such as higher efficiency in power delivery, easier modification in revising or adding parts to achieve more shifting stages, etc., and thus gathers more spotlight since it can more comfortably conform to fuel consumption regulation and efficiency in achieving more shifting stages.

However, such a DCT typically employs at least five wet-type clutches, increasing number of hydraulically controlled parts, and has disadvantages in terms of drag loss and power transmission efficiency by wet clutches, and disadvantages in weight and material cost.

The information included in this Background of the present invention section is only for enhancement of understanding of the general background of the present invention and may not be taken as an acknowledgement or any form of suggestion that this information forms the related art already known to a person skilled in the art.

BRIEF SUMMARY

Various aspects of the present invention are directed to providing a power transmission apparatus of a hybrid electric vehicle having an engine and a first motor-generator, including a first input shaft mounted along an axis of an engine output shaft and selectively connectable to the engine output shaft, a second input shaft formed as a hollow shaft, coaxially mounted with the first input shaft without rotational interference with the first input shaft, and fixedly connected to a rotor of the first motor-generator, a third input shaft formed as a hollow shaft, coaxially mounted with the first input shaft without rotational interference with the first input shaft, and selectively connectable to the first input shaft, an intermediate shaft mounted in parallel with the first input shaft, an output shaft mounted in parallel to the first input shaft and outputting a shifted torque, a planetary gear set mounted on the output shaft, having a rotation element fixedly connected to the output shaft, forming a shifted torque from torques selectively received from the first and third input shafts, and outputting the shifted torque to the output shaft, and a plurality of gear sets mounted on the first, second, and third input shafts, the intermediate shaft, and the output shaft.

The plurality of gear sets may include a first gear set including a second external gear fixedly connected to the third input shaft, and a third external gear rotatably mounted on the output shaft, externally gear-meshed with the second external gear, fixedly connected to a ring gear of the planetary gear set, and selectively connectable to the output shaft, a second gear set including a second shifting gear fixedly mounted on the third input shaft, and a first shifting gear rotatably mounted on the intermediate shaft, externally gear-meshed with the second shifting gear, and selectively connectable to the intermediate shaft, a third gear set including a first input gear fixedly connected to the first input shaft, a first external gear fixedly mounted on the intermediate shaft and externally gear-meshed with the first input gear, and a fourth external gear rotatably mounted on the output shaft, externally gear-meshed with the first input gear, and selectively connectable to the planet carrier of the planetary gear set, a fourth gear set including a third shifting gear rotatably mounted on the second input shaft and selectively connectable to the second input shaft, and a fifth external gear fixedly connected to the output shaft and externally gear-meshed with the third shifting gear, a fifth gear set including a fourth shifting gear rotatably mounted on the second input shaft and selectively connectable to the second input shaft, and a sixth external gear fixedly connected to the output shaft and externally gear-meshed with the fourth shifting gear, and a sixth gear set including an output gear fixedly mounted on the output shaft, and a final reduction gear of the differential externally gear-meshed with the output gear.

The first shifting gear may be selectively connectable to the intermediate shaft by a first synchronizer. The third input shaft may be selectively connectable to the first input shaft by a second synchronizer. The third and fourth shifting gears may be selectively connectable to the second input shaft by a third synchronizer.

The planetary gear set may be formed as a single pinion planetary gear set.

The planetary gear set may be mounted between the first and third gear sets, and includes a sun gear fixedly connected to the output shaft, a ring gear fixedly connected to the third external gear of the first gear set, and a planet carrier selectively connectable to the fourth external gear of the third gear set.

The first input shaft is selectively connectable to the engine output shaft by an engine clutch.

The third external gear may be selectively connectable to the output shaft by a first dog clutch. The fourth external gear may be selectively connectable to a planet carrier of the planetary gear set by a second dog clutch.

The exemplary power transmission may further include a second motor-generator, and a motor shaft connected to a second rotor of the second motor-generator, mounted in parallel with the intermediate shaft and externally gear-meshed with the intermediate shaft.

The plurality of gear sets may include a first gear set including a second external gear fixedly connected to the third input shaft, and a third external gear rotatably mounted on the output shaft, externally gear-meshed with the second external gear, fixedly connected to a ring gear of the planetary gear set, and selectively connectable to the output shaft, a second gear set including a second shifting gear fixedly mounted on the third input shaft, and a first shifting gear rotatably mounted on the intermediate shaft, externally gear-meshed with the second shifting gear, and selectively connectable to the intermediate shaft, a third gear set including a first input gear fixedly connected to the first input shaft, a first external gear fixedly mounted on the intermediate shaft and externally gear-meshed with the first input gear, a fourth external gear rotatably mounted on the output shaft, externally gear-meshed with the first input gear, and selectively connectable to the planet carrier of the planetary gear set, and a motor gear fixedly mounted on the motor shaft and externally gear-meshed with the first external gear, a fourth gear set including a third shifting gear rotatably mounted on the second input shaft and selectively connectable to the second input shaft, and a fifth external gear fixedly connected to the output shaft and externally gear-meshed with the third shifting gear, a fifth gear set including a fourth shifting gear rotatably mounted on the second input shaft and selectively connectable to the second input shaft, and a sixth external gear fixedly connected to the output shaft and externally gear-meshed with the fourth shifting gear, and a sixth gear set including an output gear fixedly mounted on the output shaft, and a final reduction gear of the differential externally gear-meshed with the output gear.

The first shifting gear may be selectively connectable to the intermediate shaft by a first synchronizer. The third input shaft may be selectively connectable to the first input shaft by a second synchronizer. The third and fourth shifting gears may be selectively connectable to the second input shaft by a third synchronizer.

According to a power transmission apparatus of a hybrid electric vehicle according to an exemplary embodiment of the present invention, an engine mode having five fixed shifting stages is realized by employing a planetary gear set PG on an output shaft OS. Furthermore, one or two motor-generators MG1 and MG2 may be additionally employed to realize a parallel hybrid mode having five fixed shifting stages, an electric vehicle mode (EV mode) having two shifting stages, and a Series mode having two shifting stages.

Therefore, various shifting modes may be realized, providing benefit in power delivery performance, and improving torque continuity in the five fixed shifting stages due to a torque assist through the parallel hybrid mode.

Furthermore, three synchronizers and two dog clutches are employed instead of typical wet-type clutches, and therefore, weight of a transmission and drag loss of wet-type clutches may be decreased, improving fuel consumption characteristic.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together are configured to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not limited.

Figure 1:
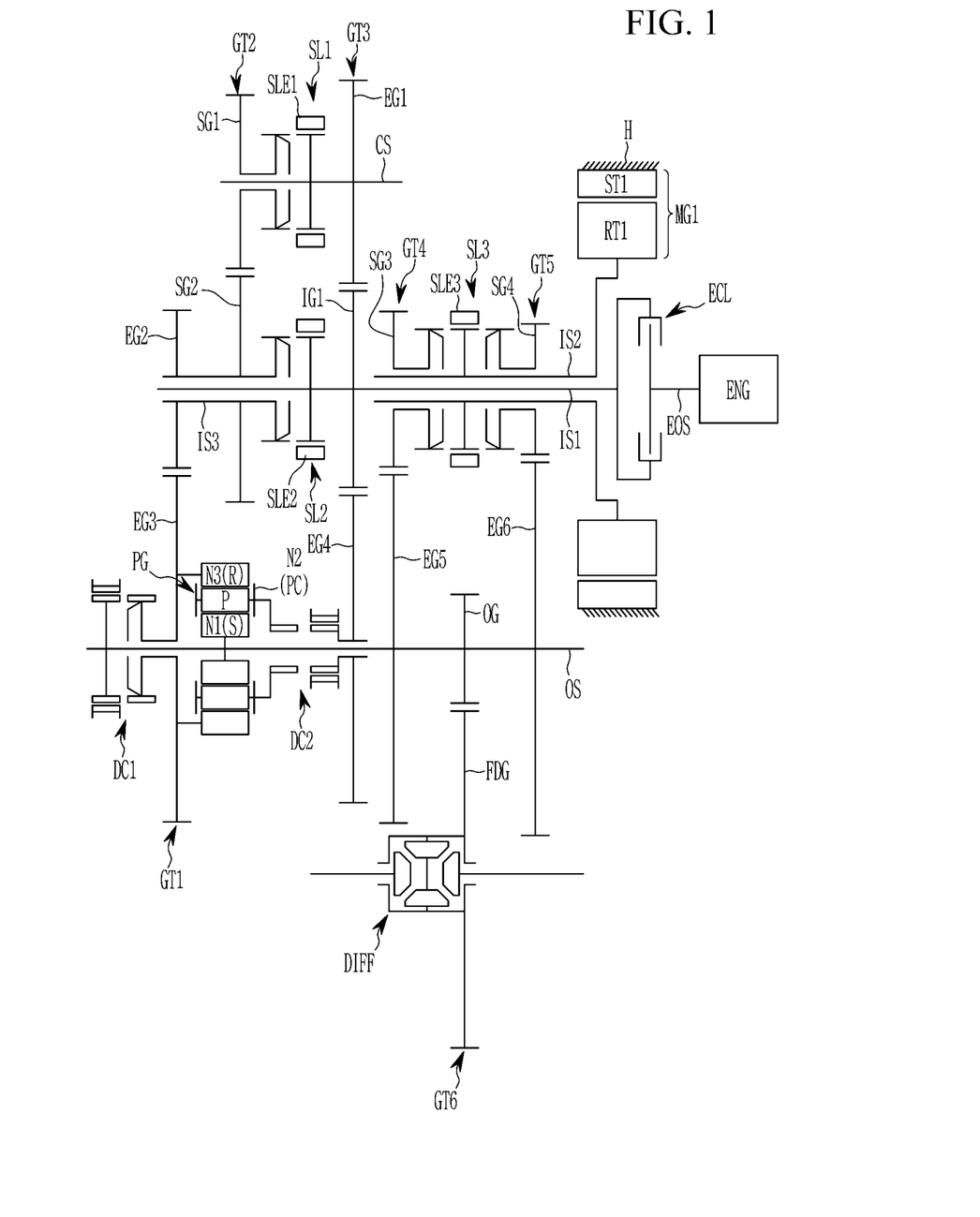
FIG. 1 is a schematic view of a power transmission apparatus of a hybrid electric vehicle according to various exemplary embodiments.

FIG. 1 is a schematic view of a power transmission apparatus of a hybrid electric vehicle according to various exemplary embodiments.

Referring to FIG. 1, a power transmission apparatus according to various exemplary embodiments shifts torques received from power sources of an engine ENG and a first motor-generator MG1 and outputs a shifted torque, and includes first, second, and third input shafts IS1, IS2, and IS3, an intermediate shaft CS, an output shaft OS, a planetary gear set PG, and a plurality of gear sets GT1, GT2, GT3, GT4, GT5, and GT6.

The engine ENG is a primary power source, and may be implemented as one of various types such as a gasoline engine or a diesel engine.

The first motor-generator MG1 may act as a motor and also as a generator, and includes a first stator ST1 and a first rotor RT1, where the first stator ST1 is fixed to a transmission housing H and the first rotor RT1 is internally mounted within the first stator St1 and rotatable relative to the first stator ST1.

The torques of the engine ENG and the first motor-generator MG1 transmitted to the first input shaft IS1 and the second input shaft IS2 are shifted by the first to sixth gear sets GT1 to GT6 and a planetary gear set PG into a plurality of shifting stages, and outputted to a differential DIFF through first and second output shafts OS1 and OS2.

The first, second, and third input shafts IS1, IS2, and IS3 are mounted on a same axis, and the intermediate shaft CS and the output shaft OS are mounted in parallel with the first input shaft IS1.

The first input shaft IS1 is mounted along an axis of an engine output shaft EOS, and selectively connectable to the engine output shaft EOS, selectively receiving the torque of the engine ENG.

The second input shaft IS2 is formed as a hollow shaft and coaxially mounted with the first input shaft IS1 without rotational interference therebetween, and fixedly connected to a first rotor RT1 of the first motor-generator MG1.

That is, the second input shaft IS2 always receives the torque of the first motor-generator MG1.

Here, the first motor-generator MG1 is mounted on an axis of the engine output shaft EOS.

The third input shaft IS3 is formed as a hollow shaft and coaxially mounted with the first input shaft IS1 without rotational interference therebetween, and selectively connectable to the first input shaft IS1.

The intermediate shaft CS is mounted in parallel with the first input shaft IS1, and connected to the first and third input shafts IS1 and IS3 through external gear engagements.

The output shaft OS is mounted in parallel with the first input shaft IS1. The output shaft OS receives a shifted torque from the first, second, and third input shafts IS1, IS2, and IS3 through the first, third, fourth, and fifth gear sets GT1, GT3, GT4, and GT5, and transmits the received torque to a differential DIFF through the sixth gear set GT6 of a first output gear OG1 and a final reduction gear FDG.

The planetary gear set PG is mounted on the output shaft OS, fixedly connected to the output shaft OS through a sun gear S of a first rotation element N1, and forms a shifted torque from torques received through the first and third input shafts IS1 and IS3, outputting the shifted torque through the output shaft OS.

The planetary gear set PG is a single pinion planetary gear set, and includes a first rotation element N1 of a sun gear S, a second rotation element N2 of a planet carrier PC rotatably supporting a plurality of pinion gears P externally gear-meshed with the sun gear S, and a third rotation element N3 of a ring gear R internally gear-meshed with the plurality of pinion gears P engaged with the sun gear S.

The plurality of gear sets are mounted over the first, second, and third input shafts IS1, IS2, and IS3, the intermediate shaft CS, and the output shaft OS, and form a plurality of shifted torques from the torques of the first and second input shafts IS1 and IS2.

In more detail, the plurality of gear sets include first, second, third, fourth, fifth, and sixth gear sets GT1, GT2, GT3, GT4, GT5, and GT6 that are mounted over the first, second, and third input shafts IS1, IS2, and IS3, the intermediate shaft CS, and the output shaft OS.

The first gear set GT1 includes a second external gear EG2 fixedly connected to the third input shaft IS3, and a third external gear EG3 mounted on the output shaft OS without rotational interference therebetween, externally gear-meshed with the second external gear EG2, fixedly connected to the ring gear R of the planetary gear set PG, and selectively connectable to the output shaft OS.

The second gear set GT2 includes a second shifting gear SG2 fixedly mounted on the third input shaft IS3, and a first shifting gear SG1 mounted on the intermediate shaft CS without rotational interference therebetween, externally gear-meshed with the second shifting gear SG2, and selectively connectable to the intermediate shaft CS.

The third gear set GT3 includes a first input gear IG1 fixedly connected to the first input shaft IS1, a first external gear EG1 fixedly mounted on the intermediate shaft CS and externally gear-meshed with the first input gear IG1, and a fourth external gear EG4 mounted on the output shaft OS without rotational interference therebetween, externally gear-meshed with the first input gear IG1, and selectively connectable to the planet carrier PC of the planetary gear set PG.

The fourth gear set GT4 includes a third shifting gear SG3 mounted on the second input shaft IS2 without rotational interference and selectively connectable to the second input shaft IS2, and a fifth external gear EG5 fixedly connected to the output shaft OS and externally gear-meshed with the third shifting gear SG3.

The fifth gear set GT5 includes a fourth shifting gear SG4 mounted on the second input shaft IS2 without rotational interference and selectively connectable to the second input shaft IS2, and a sixth external gear EG6 fixedly connected to the output shaft OS and externally gear-meshed with the fourth shifting gear SG4.

The sixth gear set GL6 includes an output gear OG fixedly mounted on the output shaft OS, and a final reduction gear FDG of the differential DIFF externally gear-meshed with the output gear OG.

Here, the planetary gear set PG is mounted between the first gear set GT1 and the third gear set GT3, and includes a sun gear S fixedly connected to the output shaft, a ring gear R fixedly connected to the third external gear EG3 of the first gear set GT1, and a planet carrier PC selectively connectable to the fourth external gear EG4 of the third gear set GT3.

Gear ratios of drive and driven gears of the first, second, third, fourth, fifth, and sixth gear sets GT1, GT2, GT3, GT4, GT5, and GT6 may be appropriately set according to desired feature of the transmission.

Engagement elements of clutches and synchronizer are further provided to enable the selective connections, and in the various exemplary embodiments of the present invention, an engine clutch ECL, first and second dog clutches DC1 and DC2, and first, second, and third synchronizers SL1, SL2, and SL3 are provided.

The engine clutch ECL is mounted between the engine output shaft EOS and the first input shaft IS1, and selectively connects the engine output shaft EOS and the first input shaft IS1, controlling power delivery therebetween.

The first dog clutch DC1 is mounted between the third external gear EG3 and the output shaft OS, and selectively connects the third external gear EG3 and the output shaft OS, controlling power delivery therebetween.

The second dog clutch DC2 is mounted between the fourth external gear EG4 and the planet carrier PC of the planetary gear set PG, and selectively connects the fourth external gear EG4 and the planet carrier PC, controlling power delivery therebetween.

The first synchronizer SL1 is mounted between the first shifting gear SG1 and the intermediate shaft CS, and selectively connects the first shifting gear SG1 and the intermediate shaft CS.

The second synchronizer SL2 is mounted between the first input shaft IS1 and the third input shaft IS3 formed with the second shifting gear SG2, and selectively connects the third input shaft IS3 and the first input shaft IS1.

Furthermore, the third synchronizer SL3 is mounted between the third and fourth shifting gears SG3 and SG4 and the second input shaft IS2, and selectively connects the third shifting gear SG3 or the fourth shifting gear SG4 to the second input shaft IS2.

The engagement element of the engine clutch ECL may be realized as multi-plate hydraulic pressure friction devices that are frictionally engaged by hydraulic pressure, however, it may not be understood to be limited thereto, since various other configuration that are electrically controllable may be available.

Furthermore, the first and second dog clutches DC1 and DC2 are formed as clutches facilitating torque transmission through teeth engagement, and Accordingly, power delivery efficiency to the output shaft OS may be enhanced, and an overall length of a transmission may be decreased compared with using synchronizers or typical wet-type clutches.

The first, second, and third synchronizers SL1, SL2, and SL3 may be formed as a known scheme, and first, second, third sleeve SLE1, SLE2, and SLE3 applied to the first, second, and third synchronizers SL1, SL2, and SL3 may be operated by actuators which may be controlled by a transmission control unit.

In an arrangement of the power transmission apparatus of a hybrid electric vehicle, the first to fifth gear sets GT1 to GT5 may be mounted in the order of first, second, third, fourth, and fifth gear sets GT1, GT2, GT3, GT4, and GT5 from an opposite side of the engine ENG, and sixth gear set GT6 may be mounted between the fourth and fifth gear sets GT4 and GT5 which is spaced by the third synchronizer SL3.

Figure 2:
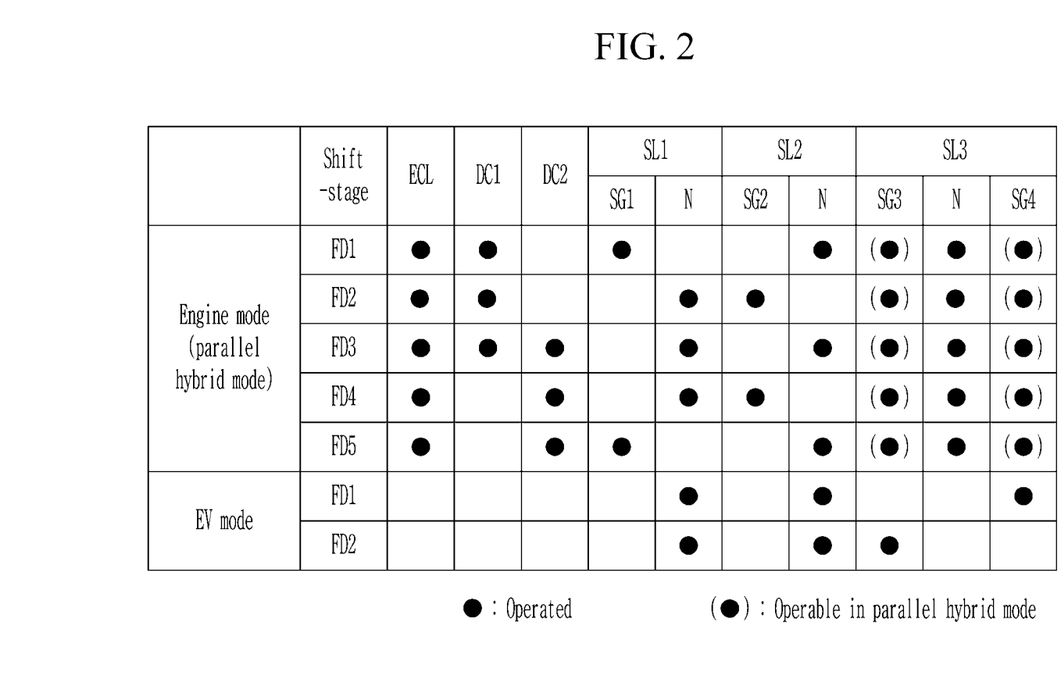
FIG. 2 is an operation chart of a power transmission apparatus of a hybrid electric vehicle according to various exemplary embodiments.

FIG. 2 is an operation chart of a power transmission apparatus of a hybrid electric vehicle according to various exemplary embodiments of FIG. 1, and the power transmission apparatus according to various exemplary embodiments of FIG. 1 may provide an engine mode and a parallel hybrid mode respectively having five fixed shifting stages and an electric vehicle modes (EV mode) having two shifting stages, which is hereinafter described in detail.

[Engine Mode First Forward Speed (Parallel Hybrid Mode First Forward Speed)]

In an engine mode first forward speed FD1, as shown in FIG. 2, the first sleeve SLE1 of the first synchronizer SL1 is operated to synchronously connect the first shifting gear SG1 to the intermediate shaft CS, and the engine clutch ECL and the first dog clutch DC1 are simultaneously operated.

As a result, by the operation of the engine clutch ECL and the first synchronizer SL1, the torque of the engine ENG passes through the engine output shaft EOS, the first input shaft IS1, the third gear set GT3, the intermediate shaft CS, the second gear set GT2, the third input shaft IS3, and the first gear set GT1.

As such, the torque received at the first gear set GT1 is transmitted to the differential DIFF through the output shaft OS by the operation of the first dog clutch DC1, realizing the first forward speed.

The engine mode first forward speed FD1 is described in connection with the case of being driven by the driving torque of the engine ENG. However, it may be understood that a parallel hybrid mode is also available, when the third sleeve SLE3 of the third synchronizer SL3 is operated to synchronously connect the third shifting gear SG3 or fourth shifting gear SG4 to the second input shaft IS2, and the first motor/generator MG1 is operated, such that the torque of the first motor-generator MG1 is delivered to the output shaft OS through the second input shaft IS2 and the fourth gear set GT4 or the fifth gear set GT5.

[Engine Mode Second Forward Speed (Parallel Hybrid Mode Second Forward Speed)]

In an engine mode second forward speed FD2, as shown in FIG. 2, the second sleeve SLE2 of the second synchronizer SL2 is operated to synchronously connect the third input shaft IS3 to the first input shaft IS1, and the engine clutch ECL and the first dog clutch DC1 are simultaneously operated.

As a result, by the operation of the engine clutch ECL and the second synchronizer SL2, the torque of the engine ENG passes through the engine output shaft EOS, the first input shaft IS1, the third input shaft IS3, and the first gear set GT1.

As such, the torque received at the first gear set GT1 is transmitted to the differential DIFF through the output shaft OS by the operation of the first dog clutch DC1, realizing the second forward speed.

The engine mode second forward speed FD2 is described in connection with the case of being driven by the driving torque of the engine ENG. However, it may be understood that a parallel hybrid mode is also available, when the third sleeve SLE3 of the third synchronizer SL3 is operated to synchronously connect the third shifting gear SG3 or fourth shifting gear SG4 to the second input shaft IS2, and the first motor/generator MG1 is operated, such that the torque of the first motor-generator MG1 is delivered to the output shaft OS through the second input shaft IS2 and the fourth gear set GT4 or the fifth gear set GT5.

[Engine Mode Third Forward Speed (Parallel Hybrid Mode Third Forward Speed)]

In an engine mode third forward speed FD3, as shown in FIG. 2, the engine clutch ECL and the first and second dog clutches DC1 and DC2 are simultaneously operated.

As a result, by the operation of the engine clutch ECL, the torque of the engine ENG passes through the engine output shaft EOS, the first input shaft IS1, and the third gear set GT3.

Furthermore, by the operation of the first dog clutch DC1, the planetary gear set PG integrally rotates since the ring gear R and the sun gear S are interconnected, and the torque received at the third gear set GT3 is delivered to the planet carrier PC of the planetary gear set PG by the operation of the second dog clutch DC2.

As a result, the torque received through the third gear set GT3 is delivered to the differential DIFF through the output shaft OS fixedly connected to the sun gear S, realizing the third forward speed.

The engine mode third forward speed FD3 is described in connection with the case of being driven by the driving torque of the engine ENG. However, it may be understood that a parallel hybrid mode is also available, when the third sleeve SLE3 of the third synchronizer SL3 is operated to synchronously connect the third shifting gear SG3 or fourth shifting gear SG4 to the second input shaft IS2, and the first motor/generator MG1 is operated, such that the torque of the first motor-generator MG1 is delivered to the output shaft OS through the second input shaft IS2 and the fourth gear set GT4 or the fifth gear set GT5.

[Engine Mode Fourth Forward Speed (Parallel Hybrid Mode Fourth Forward Speed)]

In an engine mode fourth forward speed FD4, as shown in FIG. 2, the second sleeve SLE2 of the second synchronizer SL2 is operated to synchronously connect the third input shaft IS3 to the first input shaft IS1, and the engine clutch ECL and the second dog clutch DC2 are simultaneously operated.

As a result, by the operation of the engine clutch ECL and the second synchronizer SL2, the torque of the engine ENG passes through the engine output shaft EOS, the first input shaft IS1, the third input shaft IS3, and the first gear set GT1, and also passes from the first input shaft IS1 to the third gear set GT3.

Furthermore, the torque received at the first gear set GT1 is delivered to the ring gear R of the planetary gear set PG, and the torque received at the third gear set GT3 is delivered to the planet carrier PC of the planetary gear set PG by the operation of the second dog clutch DC2.

As such, the torques delivered to the ring gear R and the planet carrier PC of the planetary gear set PG through the first gear set GT1 and the third gear set GT3 is increased in a rotation speed, and is delivered to the differential DIFF through the output shaft OS connected to the sun gear S, realizing the fourth forward speed.

The engine mode fourth forward speed FD4 is described in connection with the case of being driven by the driving torque of the engine ENG. However, it may be understood that a parallel hybrid mode is also available, when the third sleeve SLE3 of the third synchronizer SL3 is operated to synchronously connect the third shifting gear SG3 or fourth shifting gear SG4 to the second input shaft IS2, and the first motor/generator MG1 is operated, such that the torque of the first motor-generator MG1 is delivered to the output shaft OS through the second input shaft IS2 and the fourth gear set GT4 or the fifth gear set GT5.

[Engine Mode Fifth Forward Speed (Parallel Hybrid Mode Fifth Forward Speed)]

In an engine mode fifth forward speed FD5, as shown in FIG. 2, the first sleeve SLE1 of the first synchronizer SL1 is operated to synchronously connect the first shifting gear SG1 to the intermediate shaft CS, and the engine clutch ECL and the second dog clutch DC2 are simultaneously operated.

As a result, by the operation of the engine clutch ECL and the first synchronizer SL1, the torque of the engine ENG passes through the engine output shaft EOS, the first input shaft IS1, the third gear set GT3, the intermediate shaft CS, the second gear set GT2, the third input shaft IS3, and the first gear set GT1.

Furthermore, the torque received at the first gear set GT1 is delivered to the ring gear R of the planetary gear set PG, and the torque received at the third gear set GT3 is delivered to the planet carrier PC of the planetary gear set PG by the operation of the second dog clutch DC2.

As such, the torques delivered to the ring gear R and the planet carrier PC of the planetary gear set PG through the first gear set GT1 and the third gear set GT3 is increased in a rotation speed, and is delivered to the differential DIFF through the output shaft OS connected to the sun gear S, realizing the fifth forward speed.

The engine mode fifth forward speed FD5 is described in connection with the case of being driven by the driving torque of the engine ENG. However, it may be understood that a parallel hybrid mode is also available, when the third sleeve SLE3 of the third synchronizer SL3 is operated to synchronously connect the third shifting gear SG3 or fourth shifting gear SG4 to the second input shaft IS2, and the first motor/generator MG1 is operated, such that the torque of the first motor-generator MG1 is delivered to the output shaft OS through the second input shaft IS2 and the fourth gear set GT4 or the fifth gear set GT5.

[EV Mode First Forward Speed]

In an EV mode first forward speed FD1, as shown in FIG. 2, the engine clutch ECL is released, and the engine ENG is stopped. In the instant state, the third sleeve SLE3 of the third synchronizer SL3 is operated to synchronously connect the fourth shifting gear SG4 to the second input shaft IS2, and the first motor-generator MG1 is operated.

As a result, the torque of the first motor-generator MG1 is delivered to the output shaft OS through the second input shaft IS2 and the fifth gear set GT5, realizing an electric vehicle mode (EV mode) first speed FD1. At the instant time, when the first motor-generator MG1 is driven in an opposite direction thereof, a reverse speed is available.

[EV Mode Second Forward Speed]

In an EV mode second forward speed FD2, as shown in FIG. 2, as shown in FIG. 2, the engine clutch ECL is released, and the engine ENG is stopped. In the instant state, the third sleeve SLE3 of the third synchronizer SL3 is operated to synchronously connect the third shifting gear SG3 to the second input shaft IS2, and the first motor-generator MG1 is operated.

As a result, the torque of the first motor-generator MG1 is delivered to the output shaft OS through the second input shaft IS2 and the fourth gear set GT4, and therefore, an electric vehicle mode (EV mode) second forward speed FD2 is realized. At the instant time, when the first motor-generator MG1 is driven in an opposite direction thereof, a reverse speed is available.

Figure 3:
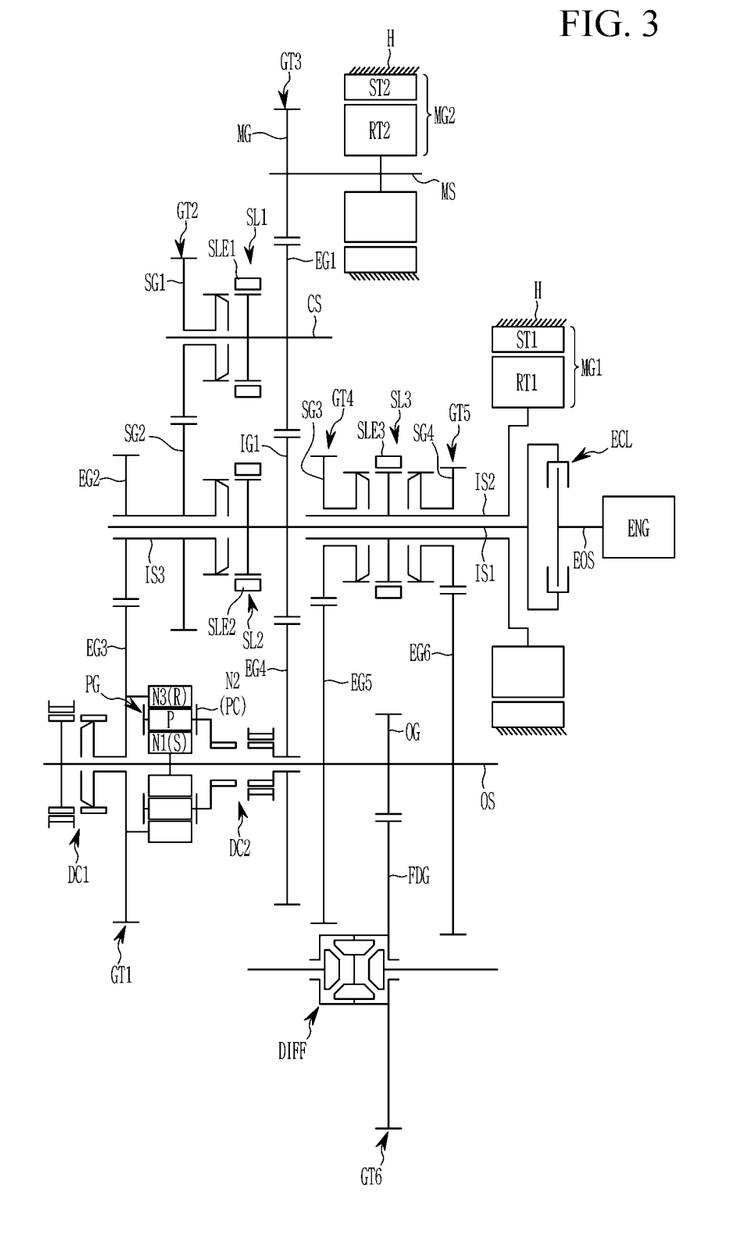
FIG. 3 is a schematic view of a power transmission apparatus of a hybrid electric vehicle according to various exemplary embodiments.

FIG. 3 is a schematic view of a power transmission apparatus of a hybrid electric vehicle according to various exemplary embodiments.

Referring to FIG. 3, a power transmission apparatus according to various exemplary embodiments differs from the various exemplary embodiments of FIG. 1 in that a second motor-generator MG2 is further employed as a power source, and a motor shaft MS mounted in parallel with the intermediate shaft CS and externally gear-meshed with the intermediate shaft CS is further employed.

Here, the motor shaft MS is fixedly connected a second rotor RT2 of the second motor-generator MG2, and directly receives the torque of the second motor-generator MG2.

Such various exemplary embodiments of FIG. 3 differ from the various exemplary embodiments of FIG. 1 in that the second motor-generator MG2 is further employed, and the third gear set GT3 further includes the motor gear MG fixedly mounted on the motor shaft MS externally gear-meshed with the intermediate shaft CS.

That is, the third gear set GT3 includes a first input gear IG1 fixedly connected to the first input shaft IS1, a first external gear EG1 fixedly mounted on the intermediate shaft CS and externally gear-meshed with the first input gear IG1, a fourth external gear EG4 mounted on the output shaft OS without rotational interference therebetween, externally gear-meshed with the first input gear IG1, and selectively connectable to the planet carrier PC of the planetary gear set PG, and a motor gear MG fixedly mounted on the motor shaft MS and externally gear-meshed with the first external gear EG1.

Such a power transmission apparatus of a hybrid electric vehicle according to various exemplary embodiments of FIG. 3 merely differ from the various exemplary embodiments of FIG. 1 regarding the second motor-generator MG2, the motor shaft MS, and the third gear set GT3 further including the motor gear MG, and therefore is not further described in detail.

Figure 4:
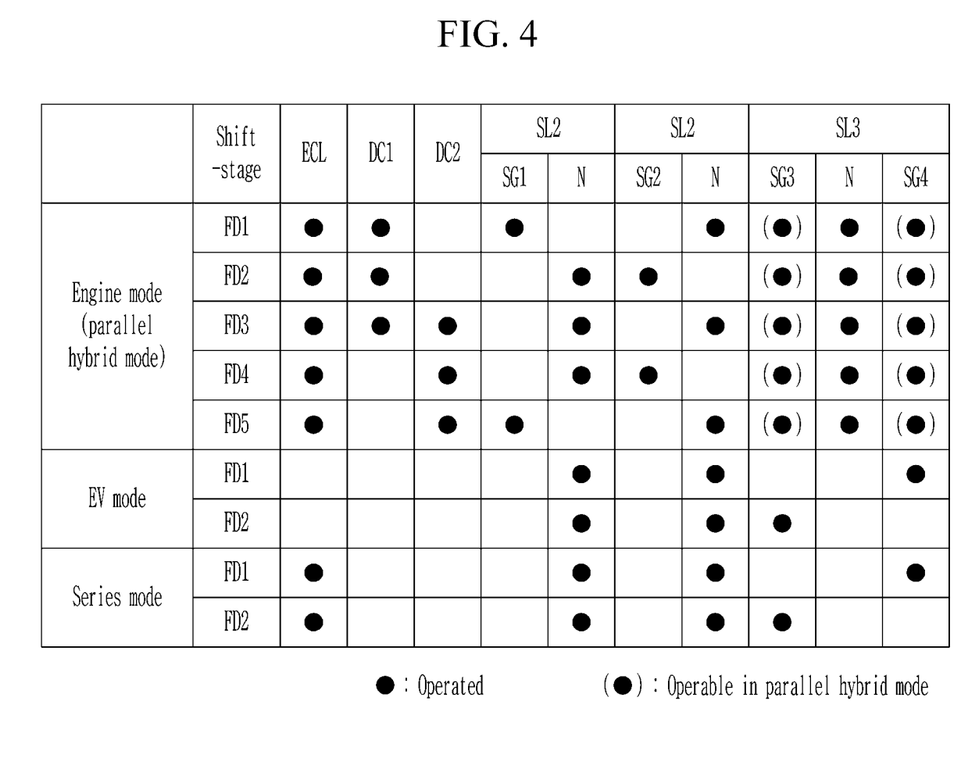
FIG. 4 is an operation chart of a power transmission apparatus of a hybrid electric vehicle according to various exemplary embodiments.

FIG. 4 is an operation chart for a power transmission apparatus according to various exemplary embodiments of the present invention in FIG. 3, and the power transmission apparatus may perform shifting operation as follows.

The same as in the various exemplary embodiments of the present invention of FIG. 1, a power transmission apparatus of a hybrid electric vehicle according to various exemplary embodiments of FIG. 3 may realize an engine mode and a parallel hybrid mode respectively having five fixed shifting stages and an electric vehicle mode (EV mode) having two shifting stages. Furthermore, by further employing a second motor-generator MG2, a Series mode having two shifting stages may be further realized, and a starting of the engine may be enabled.

According to various exemplary embodiments of the present invention of FIG. 3, the engine mode and the parallel hybrid mode respectively having five fixed shifting stages and the electric vehicle mode (EV mode) having two shifting stages are realized in the same way as in the various exemplary embodiments described with reference to FIG. 2. Hereinafter, the Series mode having two shifting stages is described in detail.

[Series Mode First Forward Speed]

In a Series mode first forward speed FD1, as shown in FIG. 4, the engine clutch ECL is operated, and the engine ENG is started by use of the second motor-generator MG2. At the same time, the third sleeve SLE3 of the third synchronizer SL3 is operated to synchronously connect the fourth shifting gear SG4 to the second input shaft IS2, and the first motor-generator MG1 is operated.

As a result, by the operation of the engine clutch ECL, the torque of the engine ENG is delivered to the second motor-generator MG2 through the engine output shaft EOS, the first input shaft IS1, and the third gear set GT3 to enable the second motor-generator MG2 to generate electricity, and the first motor-generator MG1 is driven by the electricity generated by the second motor-generator MG2.

Furthermore, the torque of the first motor-generator MG1 is delivered to the output shaft OS through the second input shaft IS2 and the fifth gear set GT5, and therefore, a Series mode first forward speed FD1 is realized. At the instant time, when the first motor-generator MG1 is driven in an opposite direction thereof, a reverse speed is available.

[Series Mode Second Forward Speed]

In a Series mode second forward speed FD2, as shown in FIG. 4, the engine clutch ECL is operated, and the engine ENG is started by use of the second motor-generator MG2. At the same time, the third sleeve SLE3 of the third synchronizer SL3 is operated to synchronously connect the third shifting gear SG3 to the second input shaft IS2, and the first motor-generator MG1 is operated.

As a result, by the operation of the engine clutch ECL, the torque of the engine ENG is delivered to the second motor-generator MG2 through the engine output shaft EOS, the first input shaft IS1, and the third gear set GT3 to enable the second motor-generator MG2 to generate electricity, and the first motor-generator MG1 is driven by the electricity generated by the second motor-generator MG2.

Furthermore, the torque of the first motor-generator MG1 is delivered to the output shaft OS through the second input shaft IS2 and the fourth gear set GT4, and therefore, a Series mode second forward speed FD2 is realized. At the instant time, when the first motor-generator MG1 is driven in an opposite direction thereof, a reverse speed is available.

According to a power transmission apparatus of a hybrid electric vehicle according to an exemplary embodiment of the present invention, an engine mode having five fixed shifting stages is realized by employing a planetary gear set PG on an output shaft OS. Furthermore, one or two motor-generators MG1 and MG2 may be additionally employed to realize a parallel hybrid mode having five fixed shifting stages, an electric vehicle mode (EV mode) having two shifting stages, and a Series mode having two shifting stages.

Therefore, various shifting modes may be realized, providing benefit in power delivery performance, and improving torque continuity in the five fixed shifting stages due to a torque assist through the parallel hybrid mode.

Furthermore, three synchronizers and two dog clutches are employed instead of typical wet-type clutches, and therefore, weight of a transmission and drag loss of wet-type clutches may be decreased, improving fuel consumption characteristic.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus of a hybrid electric vehicle having an engine and a first motor-generator, the power transmission apparatus including:

a first input shaft mounted along an axis of an engine output shaft and selectively connectable to the engine output shaft;

a second input shaft formed as a hollow shaft, coaxially mounted with the first input shaft without rotational interference with the first input shaft, and fixedly connected to a rotor of the first motor-generator;

a third input shaft formed as a hollow shaft, coaxially mounted with the first input shaft without rotational interference with the first input shaft, and selectively connectable to the first input shaft;

an intermediate shaft mounted in parallel with the first input shaft;

an output shaft mounted in parallel to the first input shaft and outputting a shifted torque;

a planetary gear set mounted on the output shaft, having a rotation element fixedly connected to the output shaft, forming the shifted torque from torques selectively received from the first and third input shafts, and outputting the shifted torque to the output shaft; and a plurality of gear sets mounted on the first, second and third input shafts, the intermediate shaft, and the output shaft.

2. The power transmission apparatus of claim 1, wherein the plurality of gear sets comprise:

a first gear set including a second gear fixedly connected to the third input shaft, and a third gear rotatably mounted on the output shaft, gear-engaged with the second gear, fixedly connected to a ring gear of the planetary gear set, and selectively connectable to the output shaft;

a second gear set including a second shifting gear fixedly mounted on the third input shaft, and a first shifting gear rotatably mounted on the intermediate shaft, gear-engaged with the second shifting gear, and selectively connectable to the intermediate shaft;

a third gear set including a first input gear fixedly connected to the first input shaft, a first gear fixedly mounted on the intermediate shaft and gear-engaged with the first input gear, and a fourth gear rotatably mounted on the output shaft, gear-engaged with the first input gear, and selectively connectable to a planet carrier of the planetary gear set;

a fourth gear set including a third shifting gear rotatably mounted on the second input shaft and selectively connectable to the second input shaft, and a fifth gear fixedly connected to the output shaft and gear-engaged with the third shifting gear;

a fifth gear set including a fourth shifting gear rotatably mounted on the second input shaft and selectively connectable to the second input shaft, and a sixth gear fixedly connected to the output shaft and gear-engaged with the fourth shifting gear; and a sixth gear set including an output gear fixedly mounted on the output shaft, and a final reduction gear of a differential gear-engaged with the output gear.

3. The power transmission apparatus of claim 2, wherein the first shifting gear is selectively connectable to the intermediate shaft by a first synchronizer, wherein the third input shaft is selectively connectable to the first input shaft by a second synchronizer; and wherein one of the third and fourth shifting gears is selectively connectable to the second input shaft by a third synchronizer.

4. The power transmission apparatus of claim 2, wherein the planetary gear set is formed as a single pinion planetary gear set.

5. The power transmission apparatus of claim 2, wherein the planetary gear set is mounted between the first and third gear sets, and includes a sun gear fixedly connected to the output shaft as the rotation element, the ring gear fixedly connected to the third gear of the first gear set, and the planet carrier selectively connectable to the fourth gear of the third gear set.

6. The power transmission apparatus of claim 2, wherein the first input shaft is selectively connectable to the engine output shaft by an engine clutch.

7. The power transmission apparatus of claim 2, wherein the third gear is selectively connectable to the output shaft by a first dog clutch;

wherein the fourth gear is selectively connectable to the planet carrier of the planetary gear set by a second dog clutch.

8. The power transmission apparatus of claim 1, further including:

a second motor-generator; and a motor shaft fixedly connected to a second rotor of the second motor-generator, mounted in parallel with the intermediate shaft and engaged with the intermediate shaft.

9. The power transmission apparatus of claim 8, wherein the plurality of gear sets comprise:

a first gear set including a second gear fixedly connected to the third input shaft, and a third gear rotatably mounted on the output shaft, gear-engaged with the second gear, fixedly connected to a ring gear of the planetary gear set, and selectively connectable to the output shaft;

a second gear set including a second shifting gear fixedly mounted on the third input shaft, and a first shifting gear rotatably mounted on the intermediate shaft, gear-engaged with the second shifting gear, and selectively connectable to the intermediate shaft;

a third gear set including a first input gear fixedly connected to the first input shaft, a first gear fixedly mounted on the intermediate shaft and gear-engaged with the first input gear, a fourth gear rotatably mounted on the output shaft, gear-engaged with the first input gear, and selectively connectable to a planet carrier of the planetary gear set, and a motor gear fixedly mounted on the motor shaft and gear-engaged with the first gear;

a fourth gear set including a third shifting gear rotatably mounted on the second input shaft and selectively connectable to the second input shaft, and a fifth gear fixedly connected to the output shaft and gear-engaged with the third shifting gear;

a fifth gear set including a fourth shifting gear rotatably mounted on the second input shaft and selectively connectable to the second input shaft, and a sixth gear fixedly connected to the output shaft and gear-engaged with the fourth shifting gear; and a sixth gear set including an output gear fixedly mounted on the output shaft, and a final reduction gear of a differential gear-engaged with the output gear.

10. The power transmission apparatus of claim 9, wherein the first shifting gear is selectively connectable to the intermediate shaft by a first synchronizer, wherein the third input shaft is selectively connectable to the first input shaft by a second synchronizer; and wherein one of the third and fourth shifting gears is selectively connectable to the second input shaft by a third synchronizer.

11. The power transmission apparatus of claim 9, wherein the planetary gear set is formed as a single pinion planetary gear set.

12. The power transmission apparatus of claim 9, wherein the planetary gear set is mounted between the first and third gear sets, and includes a sun gear fixedly connected to the output shaft as the rotation element, the ring gear fixedly connected to the third gear of the first gear set, and the planet carrier selectively connectable to the fourth gear of the third gear set.

13. The power transmission apparatus of claim 9, wherein the first input shaft is selectively connectable to the engine output shaft by an engine clutch.

14. The power transmission apparatus of claim 9,
wherein the third gear is selectively connectable to the output shaft by a first dog clutch; and
wherein the fourth gear is selectively connectable to the planet carrier of the planetary gear set by a second dog clutch.

* * * * *